(Model.)
W. E. DUNBAR.
MACHINE FOR PUTTING TIES ON BALES.
No. 382,222. Patented May 1, 1888.
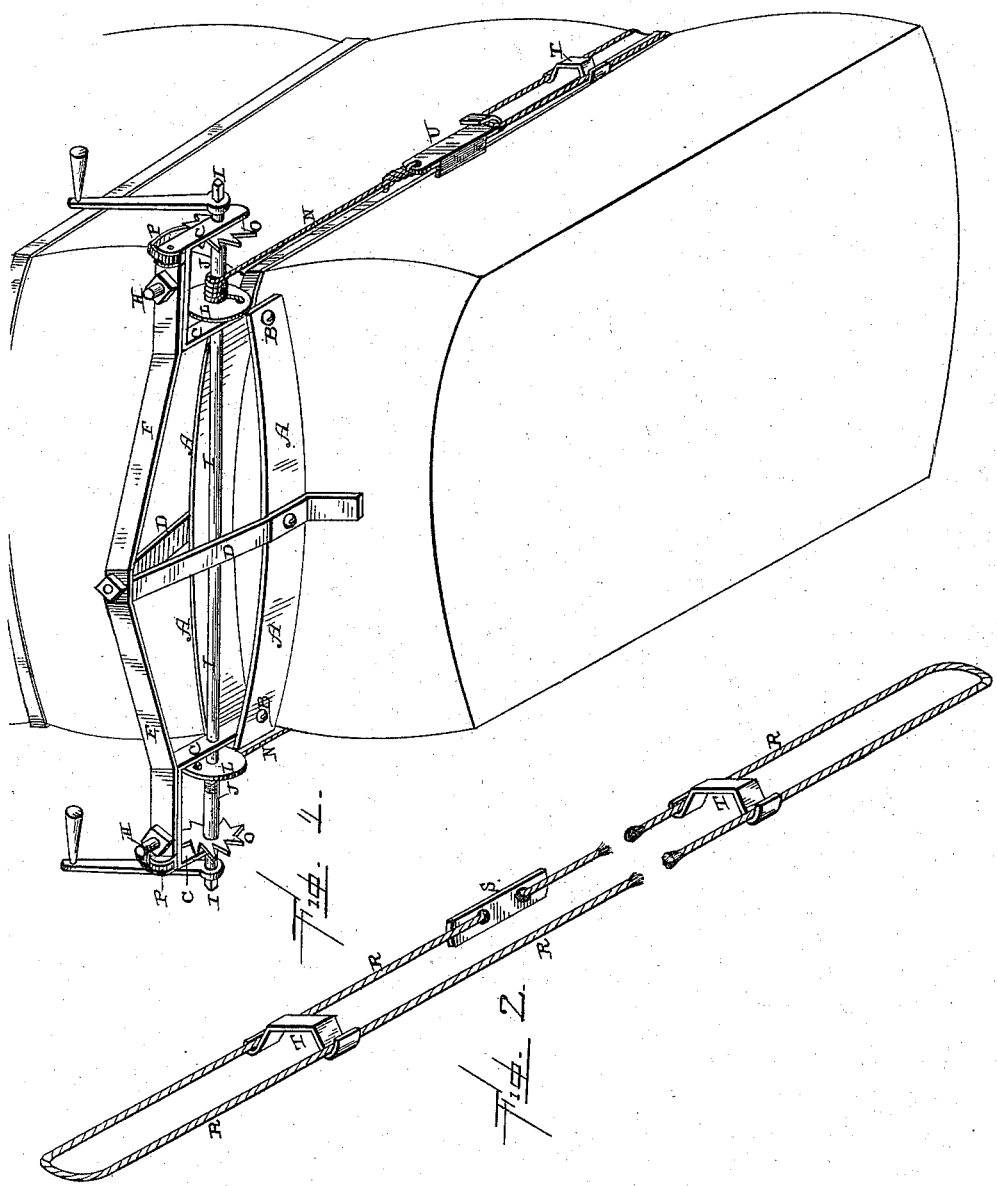
Witnesses
L. J. Gardner.
Edm. P. Ellis.
Inventor
W. E. Dunbar,
per F. A. Lehmann,
Atty

UNITED STATES PATENT OFFICE.

WILLIAM E. DUNBAR, OF WAXAHACHIE, TEXAS.

MACHINE FOR PUTTING TIES ON BALES.

SPECIFICATION forming part of Letters Patent No. 382,222, dated May 1, 1888.

Application filed January 23, 1888. Serial No. 261,580. (Model.)

*To all whom it may concern:*

Be it known that I, WILLIAM E. DUNBAR, of Waxahachie, in the county of Ellis and State of Texas, have invented certain new and useful Improvements in Machines for Putting Ties on Cotton and other Bales; and I do hereby declare the following to be a full, clear, and exact description of the invention, such as will enable others skilled in the art to which it pertains to make and use it, reference being had to the accompanying drawings, which form part of this specification.

My invention relates to an improvement in machines for putting ties on cotton and other bales; and it consists in the combination of a suitable frame-work which is to be placed across the bale where the tie is needed, a shaft journaled in the frame and provided with a reel at each end, and pawls and ratchets with hooked ropes or chains which are connected to the reels, a doubled rope which is to be passed around the bale at that point where it is to be compressed, and suitable U-shaped hooks which serve to separate the two parts of the rope, so that the tie can be passed around the bale, as will be more fully described hereinafter.

The object of my invention is to provide a machine whereby cotton and other bales can be compressed at that point where the tie has come off, so as to allow another tie to be placed around the bale, and thus prevent the loss of material and to keep the bale from bulging out at that point where the tie has been lost off.

Figure 1 is a perspective of a machine embodying my invention, showing it applied to a bale. Fig. 2 is a detached view of the double rope which passes around the bale.

A represents two bars of metal, which are secured together at their ends by the bolts B. These ends are separated from each other by the ends of the reel-frame C, which are inserted between the ends of the side bars, A, and fastened in position by the bolts B, as shown. Rising from the center of the two cross-bars A is the bent brace D, which has one or both of its ends extended outward at a right angle to the side brace, A, and on a level with their lower edges, so as to form an additional bearing upon the bale for the purpose of supporting the machine in position and preventing any liability to tip over. To the top of the brace D is secured the bar F, which serves to support the reel-frame at its ends. Suitable bolts, H, are passed through the reel-frames and the bar, as shown, and thus the reel-frames are supported rigidly in position by being attached to the bar at their tops and to the clamping-bolts B, in between the side bars, A, at one end.

Journaled in the reel-frames is the shaft I, which is adapted to have a crank applied to one or both of its ends, and which has a reel, J, attached to each end inside of the reel-frames, as shown. These reels consist of the disk L, having holes through them for the attachments of the hooked ropes N and the ratchet-reels O. In order to hold the shaft in any desired position, pawls P are pivoted upon the tops of the reel-frames, and which pawls engage with the ratchet-wheels, as shown. By turning the cranks applied to the ends of the shaft the hooked ropes or chains are wound upon the reels for the purpose of compressing the bale at that point where the tie or band is to be applied.

Passed around the bale at that point where the tie or band has come off is the double rope R, which has its ends connected together by means of the perforated metallic plate S. In order to separate the two parts of the ropes, so as to allow the tie or band to be passed freely around the bale, the U-shaped hooks T are used. These hooks have their ends formed into rings or guides, through which the rope is passed, and which can be adjusted back and forth upon the rope, so as to be placed any desired distance apart thereon. The hooks U, attached to the ropes N, are also made U-shaped by bending backward the edges of the material out of which the hook is formed, or in any other suitable manner, so that the tie or band can pass between the side of the bale and inner sides of the hooks, and thus allow the tie or band to be applied to that part of the bale where it is compressed the most.

The machine is placed across the bale at that point where it is desired to apply a band or tie, and then the double rope is placed around the bale and the hooked ropes N are made to catch in these ropes, as shown. By turning the cranks the shaft winds the ropes N upon the reels, thus compressing the bale to any desired degree. As a double rope is used in connection with the U-shaped hooks which keep the two ropes apart, and at the same time allow a bale or tie to be freely passed between them, and as the hooks T upon the rope N are also made U-shaped, the band or tie can be applied to the bale at that point where the greatest compression has taken place. The band or tie having been passed around the bale, its ends are buckled together and then the machine is removed. The ends of the two bars A are also separated, so as to allow the band or tie to pass freely between them.

Having thus described my invention, I claim—

1. The combination of the side bars, the brace rising therefrom, the bar F, the reel-frames, the shaft which is journaled in the reel-frames, and the pawls and ratchets, with the tightening-ropes, which are passed around the bale, substantially as shown.

2. The combination of the frame, the shaft, the reels, and pawls and ratchets, with the ropes N, provided with the hooks, which have U-shaped shanks, the double rope, which is passed around the bale, and the U-shaped hooks, which are applied to the rope, substantially as described.

In testimony whereof I affix my signature in presence of two witnesses.

WILLIAM E. DUNBAR.

Witnesses:
JOHN D. JENKINS,
L. MITTENTHAL.